Figure 1:
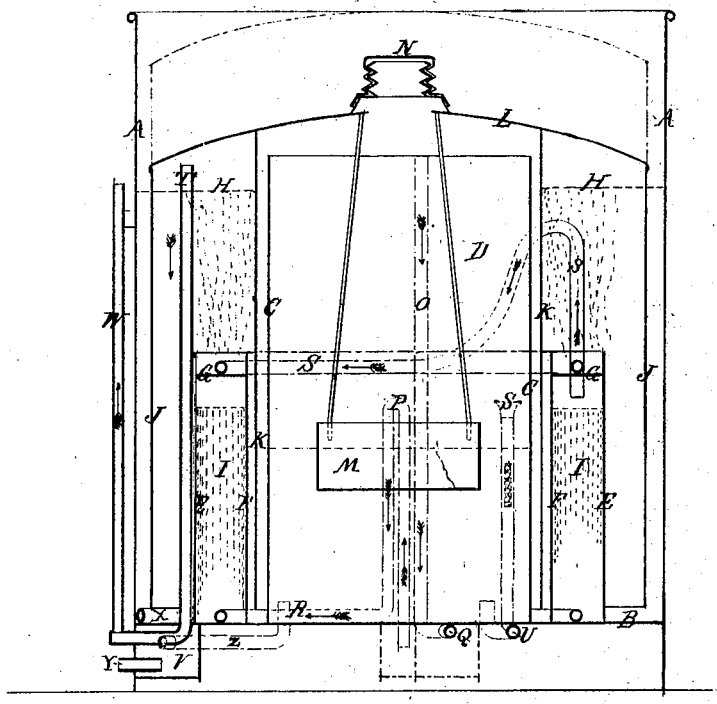
Figure 2:
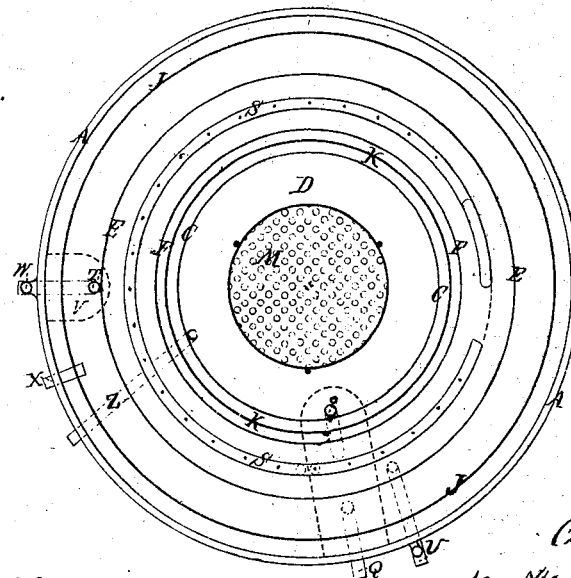

A. STEVENS.
GAS GENERATOR AND CARBURETER.

No. 98,118. Patented Dec. 21, 1869.

Witnesses
E. W. Griffin
Abraham Moore

Inventor.
Amos Stevens
By H. C. Mahurin
his attorney

United States Patent Office.

AMOS STEVENS, OF FITCHBURG, MASSACHUSETTS, ASSIGNOR TO E. A. WHITNEY, OF SAME PLACE.

Letters Patent No. 98,118, dated December 21, 1869.

---

IMPROVED GAS-GENERATOR AND CARBURETTER.

---

The Schedule referred to in these Letters Patent and making part of the same.

---

*To all whom it may concern:*

Be it known that I, AMOS STEVENS, of Fitchburg, in the county of Worcester, and State of Massachusetts, have invented Improvements in Apparatus for Generating and Carburetting Illuminating-Gas; and I do hereby declare that the following, taken in connection with the drawings, which accompany and form part of this specification, is a description of my invention sufficient to enable those skilled in the art to practice it.

The above drawings represent a hydrogen-gas generator and carburetter.

A, the outside cylinder, with a bottom B, set up in the cylinder six inches.

C is another cylinder, connected with the bottom B, forming the tank D.

The cylinder C is of proper size to form a space of about six inches between it and the outside cylinder A.

In this space is an oil-tank, formed of two cylinders E and F, connected with bottom B.

These cylinders, E and F, are three inches apart, and covered with a top, G.

The space between the cylinder A and C is filled with water up to the dotted line H.

The water covers and surrounds the oil-tank I.

In this space of water are two more cylinders, J and K, which are connected with the top L, which is free to rise or fall, according to the pressure of gas.

The tank D is filled with a solution of sulphuric acid and water up to the dotted line, in which is suspended the vessel M, by straps, from the top L.

In the vessel M are placed zinc or iron-shavings, or old scrap-iron, &c., the bottom of the vessel being perforated to admit the solution, and to allow it to escape when the vessel is raised.

The top L is fitted with a screw-cap, N, through which the solution is passed to the tank D, as is also the zinc or iron, to the vessel M.

The pipe O conveys the hydrogen from the generator, down through a space or pan designed to receive the drip.

In this space the pipe is disconnected, to allow the drip to escape.

From this space the gas is taken out through the pipe P, that passes to the top of the oil-tank, then turning down to the bottom, is perforated with numerous small holes, and lies coiled once around on the bottom of the oil-tank.

R shows a section of the perforated pipe.

The gas passes through this perforated pipe, and rising up through the oil, becomes carburetted.

The gas is then taken out of the top of the oil-tank, through the pipe S, which rises up above the water, then passing down again, under the water, to the top of the oil-tank, and lies coiled once around under water, on top of the oil-tank.

This coil is perforated, so that the gas passes out through it, and up through the water, to the space above, and being cooled and purified by the water, is ready for use.

From this space it is taken out through the pipe T, and conveyed to the drip-pan V.

From this pan it is taken out through the pipe W, and conveyed to the burners.

X is a draw-off for water.

Y, a draw-off for the drip front pan.

Z, a draw-off for solution.

Q, a draw-off from drip-pan.

U, a draw-off for oil.

In the top of this draw-off pipe is inserted a tube, rising perpendicular to cap 5. Through this cap and tube the oil is filled to the tank I.

To put the machine in operation, the tank D is filled with the solution up to the dotted line, and a quantity of zinc or iron put into the vessel M, when gas is at once found passing through the pipes, as above described, and the top L is raised, by the pressure of the gas, to the position of the dotted line, and the vessel M is raised out of the solution, and the action ceases.

In this position the machine will remain till the burners are lighted, which takes off the pressure, and the vessel M is lowered again into the solution, and more gas is formed to sustain the light. Thus it is automatic and self-regulating.

Claims.

I claim, as my invention—

1. The arrangement of four cylinders, of unequal diameters, two connected with the bottom B, and two with the top L, for the purpose above described.

2. The position and form of the oil-tank I, being formed of two cylinders, with the top G, and being placed in the centre of the space of water, is completely covered and surrounded by it, substantially as and for the purpose hereinbefore set forth.

3. Passing the gas up through the water, by means of the perforated pipe S, substantially as and for the purpose hereinbefore described and set forth.

AMOS STEVENS.

Witnesses:
NATHL. WOOD,
JOS. H. LADD.